US011763599B2

(12) United States Patent
Wang et al.

(10) Patent No.: US 11,763,599 B2
(45) Date of Patent: Sep. 19, 2023

(54) MODEL TRAINING METHOD AND APPARATUS, FACE RECOGNITION METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventors: Hao Wang, Shenzhen (CN); Di Hong Gong, Shenzhen (CN); Zhi Feng Li, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 323 days.

(21) Appl. No.: 17/314,289

(22) Filed: May 7, 2021

(65) Prior Publication Data
US 2021/0264136 A1  Aug. 26, 2021

Related U.S. Application Data

(63) Continuation of application No. PCT/CN2020/080164, filed on Mar. 19, 2020.

(30) Foreign Application Priority Data

Apr. 3, 2019  (CN) .......................... 201910266743.6

(51) Int. Cl.
*G06V 40/16* (2022.01)
*G06N 3/04* (2023.01)
(Continued)

(52) U.S. Cl.
CPC .......... *G06V 40/172* (2022.01); *G06F 18/214* (2023.01); *G06F 18/217* (2023.01);
(Continued)

(58) Field of Classification Search
CPC .. G06V 40/172; G06V 40/168; G06V 40/178; G06V 40/161; G06F 18/214;
(Continued)

(56) References Cited

U.S. PATENT DOCUMENTS

2020/0057883 A1\* 2/2020 Ge ........................ G06V 40/168
2020/0257893 A1\* 8/2020 Trani .................... G06V 40/172

FOREIGN PATENT DOCUMENTS

| CN | 106650650 A | 5/2017 |
| CN | 107480575 A | 12/2017 |
| CN | 109993125 A | 7/2019 |

OTHER PUBLICATIONS

Yitong Wang et al., "Orthogonal Deep Features Decomposition for Age-Invariant Face Recognition", Computer Vision-ECCV 2018, Oct. 7, 2018, 16pages.
(Continued)

*Primary Examiner* — Juan A Torres
(74) *Attorney, Agent, or Firm* — Sughrue Mion, PLLC

(57) ABSTRACT

A face recognition method includes: extracting a first identity feature of a first face image by using a feature extraction module, and extracting a second identity feature of a second face image by using the feature extraction module, wherein the feature extraction module is implemented by using a neural network, and pre-trained in a manner such that a correlation coefficient of training batch data is obtained based on an identity feature and an age feature of a sample face image in the training batch data, and decorrelated training of the identity feature and the age feature is performed on the feature extraction module based on the correlation coefficient; and performing a face recognition based on determining a similarity between faces in the first face image and the second face image according to the first identity feature and the second identity feature.

20 Claims, 7 Drawing Sheets

(51) Int. Cl.
　　　*G06N 3/08*　　　(2023.01)
　　　*G06F 18/22*　　　(2023.01)
　　　*G06F 18/214*　　(2023.01)
　　　*G06F 18/21*　　　(2023.01)

(52) U.S. Cl.
　　　CPC .............. *G06F 18/22* (2023.01); *G06N 3/04* (2013.01); *G06N 3/08* (2013.01); *G06V 40/168* (2022.01); *G06V 40/178* (2022.01)

(58) Field of Classification Search
　　　CPC ......... G06F 18/217; G06F 18/22; G06N 3/04; G06N 3/08; G06N 3/045
　　　USPC ....................................................... 382/118
　　　See application file for complete search history.

(56) References Cited

OTHER PUBLICATIONS

International Search Report for PCT/CN2020/080164 dated Jun. 28, 2020 [PCT/ISA/210].
Written Opinion for PCT/CN2020/080164 dated Jun. 28, 2020 [PCT/ISA/237].

\* cited by examiner

MODEL TRAINING METHOD AND APPARATUS, FACE RECOGNITION METHOD AND APPARATUS, DEVICE, AND STORAGE MEDIUM

CROSS-REFERENCE TO RELATED APPLICATION(S)

This application is a bypass continuation application of International Application No. PCT/CN2020/080164, entitled "MODEL TRAINING METHOD, FACE RECOGNITION METHOD, DEVICE AND APPARATUS, AND STORAGE MEDIUM" and filed Mar. 19, 2020, which claims priority to Chinese Patent Application No. 201910266743.6, entitled "MODEL TRAINING METHOD AND APPARATUS, FACE RECOGNITION METHOD AND APPARATUS, DEVICE, AND STORAGE MEDIUM" and filed Apr. 3, 2019, the disclosures of which are herein incorporated by reference in their entireties.

FIELD

The disclosure relates to the field of artificial intelligence (AI) technologies, and in particular, to a model training method and apparatus, an age-invariant face recognition method and apparatus, a device, and a storage medium.

BACKGROUND

In the related art, the problem of age-invariant face recognition is a major challenge in the field of face recognition. Aging diversifies the complexity of face images, which greatly increases the difficulty of face recognition. The age-invariant face recognition technology is still in an exploratory stage.

A discriminant scheme is mainly used in the related art age-invariant face recognition, which is mainly performed based on multi-task learning of identity discrimination and age discrimination. However, as an identity feature and an age feature are typically correlated, the identity feature may carry age information, which makes a face recognition result unreliable.

Therefore, there is a great need for a method to improve the performance of age-invariant face recognition.

SUMMARY

The disclosure provides a model training method, to improve the reliability of a face recognition result by decorrelating an identity feature from an age feature. The disclosure further provides corresponding apparatuses, a device, and a storage medium.

According to an aspect of an example embodiment of the disclosure, a face recognition method is provided, performed by at least one processor of a computing device, the method including:

obtaining a first face image and a second face image;

extracting a first identity feature of the first face image by using a feature extraction module, and extracting a second identity feature of the second face image by using the feature extraction module, wherein the feature extraction module is implemented by using a neural network, and pre-trained in a manner such that a correlation coefficient of training batch data is obtained based on an identity feature and an age feature of a sample face image in the training batch data, and decorrelated training of the identity feature and the age feature is performed on the feature extraction module based on the correlation coefficient; and performing a face recognition based on determining a similarity between faces in the first face image and the second face image according to the first identity feature and the second identity feature.

According to another aspect of an example embodiment of the disclosure, a model training method is provided, performed by at least one processor of a computing device, the method including:

obtaining training batch data, the training batch data including a sample face image;

extracting an identity feature and an age feature of the sample face image by using a feature extraction module, which is implemented by using a neural network;

determining a correlation coefficient corresponding to the training batch data according to the identity feature and the age feature of the sample face image in the training batch data; and performing decorrelated training of the identity feature and the age feature on the feature extraction module based on the correlation coefficient.

According to another aspect of an example embodiment of the disclosure, a face recognition apparatus is provided, the apparatus including:

at least one memory configured to store program code; and at least one processor configured to read the program code and operate as instructed by the program code, the program code comprising:

obtaining code configured to cause at least one of the at least one processor to obtain a first face image and a second face image;

extraction code configured to cause at least one of the at least one processor to: extract a first identity feature of the first face image by using a feature extraction module, and extract a second identity feature of the second face image by using the feature extraction module, wherein the feature extraction module is implemented by using a neural network, and pre-trained in a manner such that a correlation coefficient of training batch data is obtained based on an identity feature and an age feature of a sample face image in the training batch data, and decorrelated training of the identity feature and the age feature is performed on the feature extraction module based on the correlation coefficient; and determining code configured to cause at least one of the at least one processor to determine a similarity between faces in the first face image and the second face image according to the first identity feature and the second identity feature, a face recognition result based on the similarity between the first face image and the second face image being obtained.

According to another aspect of an example embodiment of the disclosure, a model training apparatus is provided, the apparatus including:

at least one memory configured to store program code; and at least one processor configured to read the program code and operate as instructed by the program code, the program code comprising:

obtaining code configured to cause at least one of the at least one processor to obtain training batch data, the training batch data including a sample face image;

extraction code configured to cause at least one of the at least one processor to extract an identity feature and an age feature of the sample face image by using a feature extraction module, which is implemented by using a neural network;

determining code configured to cause at least one of the at least one processor to determine a correlation coefficient corresponding to the training batch data according to the identity feature and the age feature of the sample face image in the training batch data; and training code configured to cause at least one of the at least one processor to perform decorrelated training of the identity feature and the age feature on the feature extraction module based on the correlation coefficient.

According to another aspect of an example embodiment of the disclosure, a computer device is provided, the computer device including a processor and a memory:

the memory being configured to store a computer program; and the processor being configured to perform, according to the computer program, the model training method or the face recognition method according to the embodiments of the disclosure.

According to another aspect of an example embodiment of the disclosure, a non-transitory computer-readable storage medium is provided. The computer-readable storage medium is configured to store a program code, and the program code is used for performing the model training method or the face recognition method according to the embodiments of the disclosure.

According to another aspect of an example embodiment of the disclosure, a computer program product including instructions is provided. The instructions, when running on a computer, cause the computer to perform the model training method or the face recognition method according to the embodiments of the disclosure.

BRIEF DESCRIPTION OF THE DRAWINGS

To describe the technical solutions of the example embodiments of the disclosure more clearly, the following briefly introduces the accompanying drawings required for describing the embodiments. The accompanying drawings in the following description show only some embodiments of the disclosure, and a person of ordinary skill in the art may still derive other drawings from these accompanying drawings without creative efforts.

DETAILED DESCRIPTION

Figure 1:
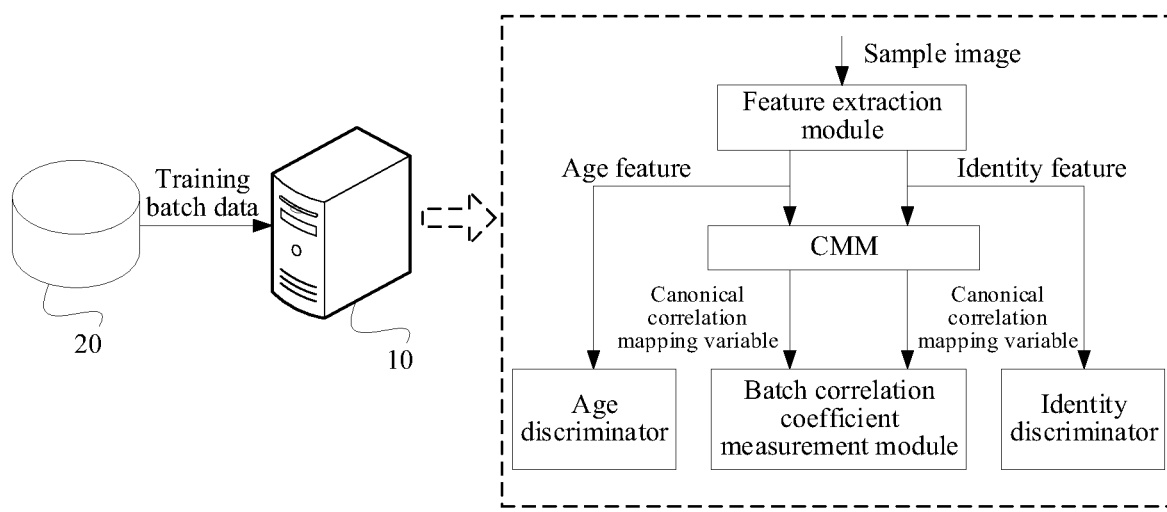
FIG. 1 is an architectural diagram of a scenario of a model training method according to an example embodiment of the disclosure.

To make objectives, technical solutions, and advantages of the disclosure clearer, the following further describes implementations of the disclosure in detail with reference to the accompanying drawings.

First, the concept of artificial intelligence (AI) is brief described.

AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, refers to using a camera and a computer to replace human eyes for performing machine vision, such as recognition, tracking, and measurement, on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition. When age-invariant face recognition is performed by using a discriminative scheme, an identity feature and an age feature are typically correlated. The identity feature includes age information, which leads to the technical problem of an unreliable recognition result. The disclosure provides a model training method. In the method, decorrelation constraint is increased in a training process, so that a feature extraction module eventually obtained through training may better decompose the identity feature and the age feature. According to the disclosure, due to a sufficiently low correlation between the identity feature and the age feature, age-invariant face recognition is less affected by the factor of age when the identity feature is used, to achieve higher recognition accuracy.

A canonical correlation mapping variable is a variable for indicating a degree of correlation between an age feature and an identity feature of a face image after correlation analysis is performed on the age feature and the identity feature. In an example embodiment, a canonical mapping module (CMM) is provided. After the age feature and the identity feature of the face image are inputted into the CMM, the CMM outputs a canonical correlation mapping variable between the age feature and the identity feature by using a canonical correlation analysis (CCA) method. The canonical correlation mapping variable is used for indicating a correlation between the age feature and the identity feature.

An adversarial loss is a loss value that is determined according to a correlation coefficient between an identity feature and an age feature in training batch data and is used for performing decorrelated training between the identity feature and the age feature. In an example embodiment, based on the adversarial loss, a canonical mapping with the highest correlation between the identity feature and the age feature is first determined, the correlation between the identity feature and the age feature is then continuously reduced in an optimal mapping direction, so as to implement the decorrelated training between the identity feature and the age feature.

An identity discrimination loss is a loss produced by an identity discriminator in a process of discriminating a face image with the identity discriminator. The identity discrimination loss is used for training discrimination accuracy of an identity discriminator, and performing, in combination with an age discrimination loss and an adversarial loss, decorrelated training between an identity feature and an age feature.

An age discrimination loss is a loss produced by an age discriminator in a process of discriminating a face image with the age discriminator. The age discrimination loss is used for training discrimination accuracy of an age discriminator, and performing, in combination with an identity discrimination loss and an adversarial loss, decorrelated training between an identity feature and an age feature.

It may be understood that the model training method provided in the disclosure is applicable to any processing device with a graphics processing capability. Specifically, the processing device may be a terminal, a server or other devices including a central processing unit (CPU) and/or a graphics processing unit (GPU). The terminal includes a desktop terminal, a mobile smart terminal such as a mobile phone/tablet computer, an in-vehicle terminal, and a wearable terminal.

The model training method may be stored in the foregoing processing device in the form of a computer program, and the foregoing processing device performs the computer program to implement the model training method provided in the disclosure.

First, an application scenario of a model training method according to an embodiment of the disclosure is described.

FIG. 1 is an architectural diagram of a scenario of a model training method according to an exemplary embodiment of the disclosure. Referring to FIG. 1, the scenario includes a server 10 and a sample database 20. The sample database 20 stores training batch data. The training batch data specifically includes a plurality of training samples. Each training sample includes a sample face image and an identity label and an age label corresponding to the sample face image. The server 10 obtains the training batch data from the sample database 20, and for each training sample in the training batch data, obtains an identity feature and an age feature corresponding to the sample face image in the training sample by using a feature extraction module, collects statistics of a correlation coefficient corresponding to the training batch data according to the obtained identity feature and age feature, and performs decorrelated training of the identity feature and the age feature based on the correlation coefficient to obtain a feature extraction module that meets a training objective.

Figure 2:
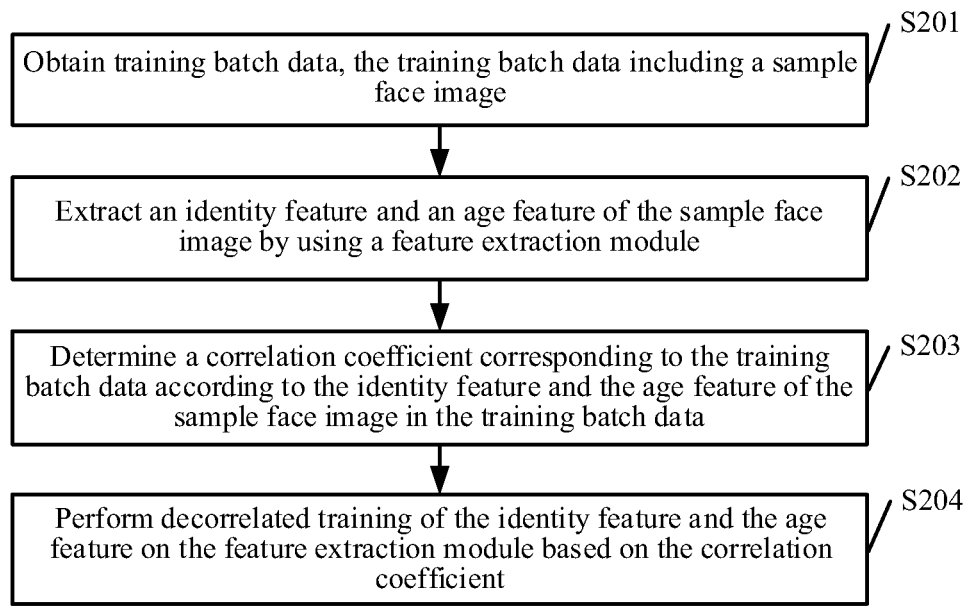
FIG. 2 is a flowchart of a model training method according to an example embodiment of the disclosure.

In combination with the foregoing application scenario, the operations of the model training method provided in this embodiment of the disclosure are described in detail. For example, the method is applied to a server. FIG. 2 is a flowchart of a model training method according to an exemplary embodiment of the disclosure. Referring to FIG. 2, the method includes the following operations:

S201: Obtain training batch data, the training batch data including a sample face image.

In some embodiments, the training batch data includes n sample face images, and n is a positive integer. In some embodiments, the sample face image is annotated with an identity label and an age label. The identity label is used for representing an identity of a person in a sample face image. For example, the identity label may be a person's ID number, a person's name, or other information that may distinguish and identify a person. When there are identical names, other information may be added for distinguishing. The age label is used for representing an age of a person in a sample face image. In some embodiments, the age label may be a specific value, for example, eighteen years old; or may be an age group, for example, the young and the middle-aged.

In some embodiments, the server may obtain the training batch data from a pre-built cross-age database, and train a face recognition model through offline learning based on the training batch data. The face recognition model includes a feature extraction module. The cross-age database stores a training sample, and the training sample may be a sample obtained by crawling a sample face image from the internet and performing identity annotation and age annotation on the sample face image. Specifically, when crawling a sample face image, it is possible to crawl a plurality of face images of different ages of a person, and perform identity annotation and age annotation on the plurality of face images to obtain a plurality of training samples.

After the plurality of training samples are obtained, the samples may be batched to obtain a plurality of pieces of training batch data. The training batch data is trained in batches, so that a loss function may be calculated in batches and parameters may be updated in batches. In this case, an update direction is relatively stable and calculation costs are relatively low.

S202: Extract an identity feature and an age feature of the sample face image by using a feature extraction module.

The feature extraction module is a module for extracting an identity feature and an age feature, and may be implemented as a neural network. In some embodiments, the feature extraction module may include an initial feature extraction module and a residual factorization module (RFM) that are cascaded. The initial feature extraction module is used for extracting an initial feature of a face image through a convolutional neural network (CNN). Specifically, the initial feature extraction module may be a CNN backbone network. The RFM is used for performing linear factorization on an initial feature through a residual network to obtain an identity feature and an age feature.

In this embodiment, backbone is constructed by using a CNN, and includes a series of convolutional layers and pooling layers connected together. In some specific examples of the disclosure, backbone may include deep residual networks ResNet, VGGNet, SEnet, or the like.

S203: Determine a correlation coefficient corresponding to the training batch data according to the identity feature and the age feature of the sample face image in the training batch data.

In some embodiments, after canonical correlation mapping variables corresponding to the identity feature and the age feature are obtained by using the CMM, statistics of correlation coefficients is collected for the canonical correlation mapping variables of the sample face image in the training batch data to obtain the correlation coefficient corresponding to the training batch data.

The CMM is a module that uses the CCA method to analyze a correlation between variables. In this embodiment, the CMM is used for analyzing a correlation between the age feature and the identity feature. For each sample face image in the training batch data, canonical correlation mapping variables between the identity feature and the age feature may be obtained by inputting the identity feature and age feature corresponding to the sample face image into the CMM.

In some embodiments, the CMM may use a batch canonical correlation analysis (BCCA) to measure the correlation between the identity feature and the age feature. In this case, in the subsequent training process, a stochastic gradient descent algorithm may be used to optimize a target value to reach a maximum or minimum value in an adversarial process.

In some embodiments, statistics of the correlation coefficient corresponding to the training batch data is collected by using a batch correlation coefficient measurement module. The batch correlation coefficient measurement module is a module that measures a correlation between an identity feature and an age feature in training batch data. Based on the canonical correlation mapping variables corresponding to the identity feature and the age feature of each sample face image, the batch correlation coefficient measurement module collects statistics of correlation coefficients to obtain the correlation coefficient corresponding to the training batch data. The correlation coefficient may represent the correlation between the identity feature and the age feature in the whole training batch data.

S204: Perform decorrelated training of the identity feature and the age feature on the feature extraction module based on the correlation coefficient.

A training objective of the model is to first find a canonical mapping with the highest correlation and then continuously minimize the correlation between the identity feature and the age feature in this optimal mapping direction. In this manner, the correlation between the identity feature and the age feature is minimized.

Specifically, uncorrelation between an identity feature and an age feature means that a correlation between the identity feature and the age feature is sufficiently low to the extent that the identity feature and the age feature may be considered uncorrelated (e.g., extremely low correlation). In an example of the disclosure, when the correlation coefficient between the identity feature and the age feature is less than a preset value, it may be considered that the two are uncorrelated. The preset value may be set as appropriate, which is not limited in this embodiment of the disclosure.

In summary, according to the model training method provided in this embodiment of the disclosure, in a training process, an identity feature and an age feature of a sample face image are decomposed by using a feature extraction module, a correlation coefficient corresponding to training batch data is determined according to the identity feature and the age feature, decorrelation constraint is increased by using the correlation coefficient, and based on decorrelated adversarial learning, the identity feature and the age feature recognized by the feature extraction module and eventually obtained through training have a sufficiently low correlation (less than a preset value), thereby improving the recognition accuracy, reducing age-induced interference, and improving the reliability of a recognition result of age-invariant face recognition.

Figure 3:
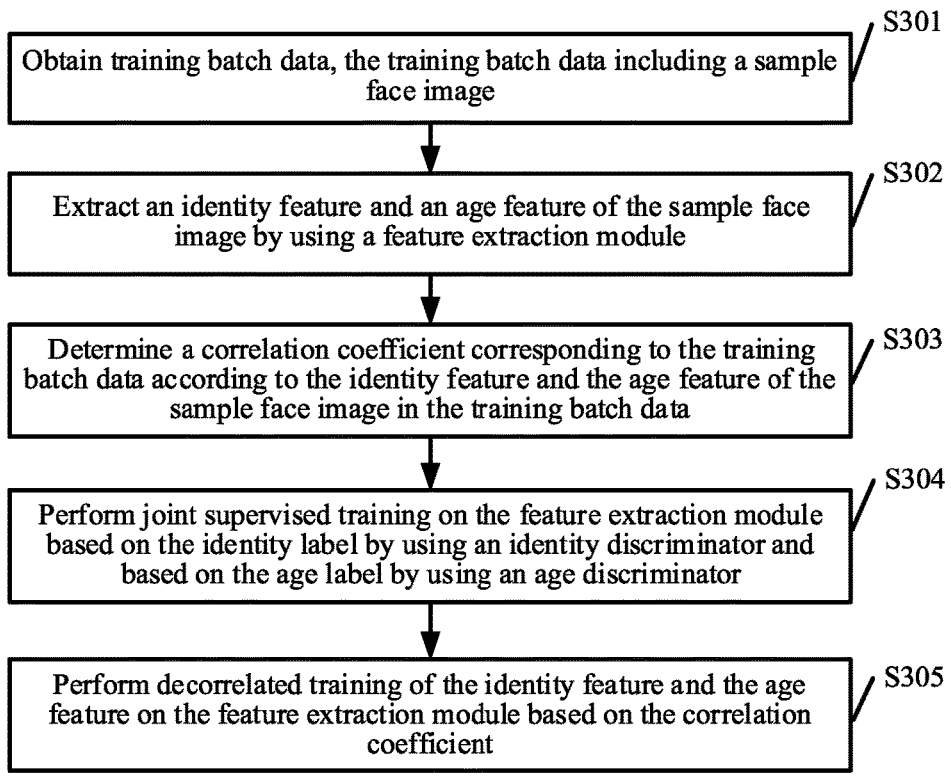
FIG. 3 is a flowchart of a model training method according to another example embodiment of the disclosure.

In an example embodiment, the sample face image is annotated with an identity label and an age label. Based on the identity label and the age label, joint supervised training is performed on the feature extraction module, and the identity feature and the age feature are decorrelated. FIG. 3 is a flowchart of a model training method according to another exemplary embodiment of the disclosure. An example in which this method is applied to a server is used for description. As shown in FIG. 3, the method includes the following operations:

S301: Obtain training batch data, the training batch data including a sample face image.

In some embodiments, the training batch data includes n sample face images, and n is a positive integer. In some embodiments, the sample face image is annotated with an identity label and an age label. The identity label is used for representing an identity of a person in the sample face image, and the age label is used for representing an age of a person in the sample face image.

S302: Extract an identity feature and an age feature of the sample face image by using a feature extraction module.

The feature extraction module is a module for extracting an identity feature and an age feature, and may be implemented as a neural network. In some embodiments, the feature extraction module may include an initial feature extraction module and an RFM that are cascaded.

When the identity feature and the age feature of the sample face image are extracted by using the feature extraction module, the initial feature of the face image is first extracted by using the initial feature extraction module, and linear factorization is performed on the initial feature by using the residual factorization module to obtain the identity feature and the age feature. The age feature is first obtained by using the residual factorization module (e.g., by using linear factorization performed by the residual factorization module), and the difference between the initial feature and the age feature is then determined, to obtain the identity feature.

S303: Determine a correlation coefficient corresponding to the training batch data according to the identity feature and the age feature of the sample face image in the training batch data.

In some embodiments, after canonical correlation mapping variables corresponding to the identity feature and the age feature are obtained by using the CMM, statistics of correlation coefficients is collected for the canonical correlation mapping variables of the sample face image in the training batch data to obtain the correlation coefficient corresponding to the training batch data.

In some embodiments, statistics of the correlation coefficient corresponding to the training batch data is collected by using a batch correlation coefficient measurement module. Based on the canonical correlation mapping variables corresponding to the identity feature and the age feature of each sample face image, the batch correlation coefficient measurement module collects statistics of correlation coefficients to obtain the correlation coefficient corresponding to the training batch data. The correlation coefficient may represent the correlation between the identity feature and the age feature in the whole training batch data.

S304: Perform joint supervised training on the feature extraction module based on the identity label by using an identity discriminator and based on the age label by using an age discriminator.

During model training, the server inputs the identity feature into the identity discriminator and inputs the age feature into the age discriminator, and then performs joint supervised learning based on the annotated identity label and age label of the sample face image. When supervised learning is performed, model parameters are updated by using a loss function of the identity discriminator and the age discriminator.

In some embodiments, the loss of the identity discriminator may be calculated by using a large margin cosine loss (LMCL) function under a CosFace framework, which helps to learn a highly discriminative deep feature.

Certainly, in other possible implementation of the embodiments of the disclosure, other loss functions with an identity feature discrimination function, for example, SphereFace, ArcFace, center loss, or a cross entropy loss function softmax, may be used.

Softmax may be used for the loss of the age discriminator. Certainly, in other possible implementation of the embodiments of the disclosure, other loss functions with an age classification function may be used. In addition, the technical solution of age regression may be used to implement age feature learning.

In some embodiments, in a training process, a parameter of at least one of the feature extraction module, the identity discriminator, or the age discriminator is updated with an objective of reducing a training loss. The training loss is determined by at least one of an adversarial loss, an identity discrimination loss, or an age discrimination loss, and the adversarial loss is determined according to the correlation coefficient. The identity discrimination loss is a loss of the identity discriminator, and the age discrimination loss is a loss of the age discriminator.

In an implementation, weighted summation is performed on the adversarial loss, the identity discrimination loss, and the age discrimination loss to obtain the training loss. The weight is used for balancing the above three losses and may be set as appropriate.

S305: Perform decorrelated training of the identity feature and the age feature on the feature extraction module based on the correlation coefficient.

A training objective of the model is to first find a canonical mapping with the highest correlation and then continuously minimize the correlation between the identity feature and the age feature in this optimal mapping direction. In this manner, the correlation between the identity feature and the age feature is minimized.

In some embodiments, a parameter of the CMM is updated with an objective of increasing an absolute value of the correlation coefficient.

Figure 4:
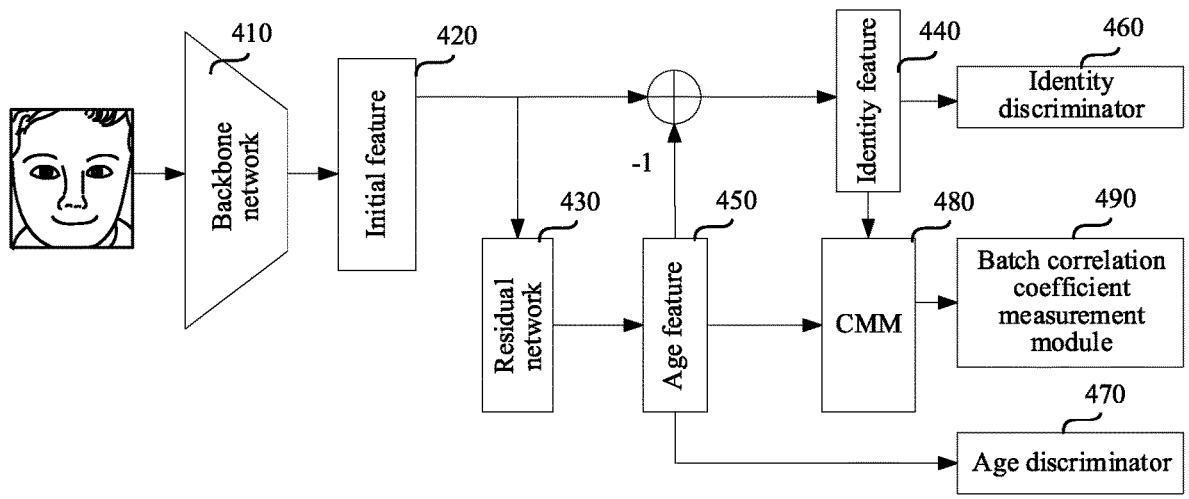
FIG. 4 is a diagram of a model training method according to an example embodiment of the disclosure.

For ease of understanding, the disclosure further provides a specific example of the model training method. FIG. 4 is a diagram of a model training method according to an example embodiment of the disclosure. Referring to FIG. 4, in this method, a sample face image annotated with an identity label and an age label is inputted. A backbone network 410 may extract an initial feature 420 of a face image in the sample face image, and then decompose the initial feature 420 into an identity feature 440 and an age feature 450 by using a residual network 430. An identity discriminator 460 learns the identity feature 440, and an age discriminator 470 learns the age feature 450. In addition, the identity feature 440 and the age feature 450 are inputted into a CMM 480 together, and adversarial learning is performed to implement correlation optimization by using a batch correlation coefficient measurement module 490, that is, a decorrelated adversarial learning (DAL) regularizer.

The processes of feature factorization and adversarial learning of the foregoing examples are described in detail below.

In the process of feature factorization, a face image p in a sample face image is set, an initial feature x is extracted by using a backbone network F and then linearly decomposed into an identity feature $x_{id}$ and an age feature $x_{age}$ by a residual network R. Specifically, factorization formulas include the following Formula 1 to Formula 3:

$$x = F(p), \qquad \text{Formula 1:}$$

$$x_{age} = R(x), \text{ and} \qquad \text{Formula 2:}$$

$$x_{id} = x - R(x). \qquad \text{Formula 3:}$$

It would be understood that the initial feature x includes the identity feature $x_{id}$ and the age feature $x_{age}$. After the initial feature x of the face image is extracted by using the initial feature extraction module, and the age feature $x_{age}$ of the face image is obtained by using the residual network, a difference between the initial feature x and the age feature $x_{age}$ of the face image may be determined as the identity feature $x_{id}$ of the face image. Through the joint supervision of the identity discriminator and the age discriminator, $x_{id}$ and $x_{age}$ have identity information and age information respectively.

Adversarial learning may be implemented by using a DAL algorithm. After $x_{id}$ and $x_{age}$ are inputted to a CMM C together, a linear combination $v_{id}$ and $v_{age}$ are outputted. Refer to the following Formula 4:

$$\forall t \in \{id, age\}: v_t = C(x_t) = w_t^T x_t, \qquad \text{Formula 4:}$$

where $w_{id}$ and $w_{age}$ are learnable mapping parameters of C, $v_{id}$ and $v_{age}$ are canonical correlation variables of the training sample, and statistics of the correlation coefficient of $v_{id}$ and $v_{age}$ is collected and the correlation coefficient is optimized in the batch correlation coefficient measurement module.

An identity feature set $B_{id}$ and an age feature set $B_{age}$ of training batch data are given, and m is a batch size (that is, the quantity of samples in the batch data). Refer to Formula 5 and Formula 6:

$$B_{id} = \{x_{id}^{1, \ldots, m}\}, \text{ and} \qquad \text{Formula 5:}$$

$$B_{age} = \{x_{age}^{1, \ldots, m}\}. \qquad \text{Formula 6:}$$

A correlation coefficient ρ is expressed as the following Formula 7:

$$\rho = \frac{\frac{1}{m}\sum_{i=1}^{m}(v_i^{id} - u_{id})(v_{age}^i - u_{age})}{\sqrt{\sigma_{id}^2 + \varepsilon}\sqrt{\sigma_{age}^2 + \varepsilon}}, \qquad \text{Formula 7}$$

where $u_{id}$ is a statistical mean of the identity feature, $u_{age}$ is a statistical mean of the age feature, $\sigma_{id}^2$ is a variance of the identity feature, $\sigma_{age}^2$ is a variance of the age feature, and $\varepsilon$ is a constant minimum value to prevent division by 0. For this target function, the disclosure may use a stochastic gradient descent (SGD) algorithm for optimization, so as to obtain the maximum or minimum absolute value $|\rho|$ of the correlation coefficient. Gradient derivation is shown in Formula 8 and Formula 9 as follows:

$$\frac{\partial \rho}{\partial u_{id}} = \frac{1}{m}\left(\frac{v_{age}-u_{age}}{\sqrt{\sigma_{id}^2+\varepsilon}\sqrt{\sigma_{age}^2+\varepsilon}} - \frac{v_{id}-u_{id}}{\sigma_{id}^2+\varepsilon}\right), \text{ and} \quad \text{Formula 8}$$

$$\frac{\partial \rho}{\partial u_{age}} = \frac{1}{m}\left(\frac{v_{id}-u_{id}}{\sqrt{\sigma_{id}^2+\varepsilon}\sqrt{\sigma_{age}^2+\varepsilon}} - \frac{v_{age}-u_{age}}{\sigma_{age}^2+\varepsilon}\right). \quad \text{Formula 9}$$

In the adversarial training, the parameters of F and R are first fixed, and the parameter of C is updated to maximize the absolute value $|\rho|$ of the correlation coefficient, that is, to find the canonical mapping with the largest correlation. The parameter of C is fixed and the parameters of F and R are updated to minimize the absolute value $|\rho|$ of the correlation coefficient. In this manner, the correlation between the identity feature and the age feature may be minimized in the mapping direction with the largest canonical correlation coefficient.

The loss function of the adversarial training may be expressed by the following Formula 10:

$$L_{DAL} = \min_{F,R}\max_{C}(|\rho(C(F(p)-R(F(p))), C(R(F(p))))|), \quad \text{Formula 10}$$

where $L_{DAL}$ represents an adversarial loss, R(F(p)) represents $x_{age}$, F(p)−R(F(p)) represents $X_{id}$, C(R(F(p))) and C(F(p)−R(F(p))) represent canonical correlation mapping variables $v_{age}$ and $v_{id}$ obtained by inputting $x_{age}$ and $x_{id}$ into the CMM C.

Therefore, the alternating adversariness of the foregoing two operations constitutes the adversarial training process. In other words, a training objective of the model is to first find a canonical mapping with the highest correlation and then continuously minimize the correlation between the identity feature and the age feature in this optimal mapping direction. In this manner, the correlation between the identity feature and the age feature is minimized.

Finally, the whole training process includes three training tasks: the identity discriminator, the age discriminator, and the DAL. An overall loss function is shown in the following Formula 11:

$$L = L_{id}(x_{id}) + \lambda_1 L_{age}(x_{age}) + \lambda_2 L_{DAL}(x_{id}, x_{age}), \quad \text{Formula 11}$$

where $L_{id}$, $L_{age}$, and $L_{DAL}$ are loss functions of the identity discriminator, the age discriminator, and adversarial training, respectively, and $\lambda_1$ and $\lambda_2$ are hyperparameters for balancing weights of the foregoing three losses. $L_{age}$ may use a softmax loss function, and $L_{id}$ may use an LMCL loss function under a CosFace framework. Refer to the following Formula 12:

$$L_{id} = \frac{1}{N}\sum_i -\log\frac{e^{s(\cos(\theta_{y_i},i)-m)}}{e^{s(\cos(\theta_{y_i},i)-m)} + \sum_{j\neq y_i} e^{s\cos(\theta_j,i)}},$$

where m is a preset classification interval hyperparameter, s is a preset scale hyperparameter, N is a quantity of categories of all identities in the training set, $y_i$ is an identity label of an $i^{th}$ training sample, and $\cos(\theta_j,i)$ is a cosine value of an angle between an identity feature vector and a classification weight vector of the $i^{th}$ training sample.

The above is only a specific example of the model training method provided by the disclosure. In other possible implementations of the embodiments of the disclosure, $L_{id}$ and $L_{age}$ may be loss functions with other identity classification functions and age classification functions, and the overall loss function L may be in other forms. During an actual implementation, a corresponding loss function and a corresponding weight may be set as appropriate.

Specifically, uncorrelation between an identity feature and an age feature means that a correlation between the identity feature and the age feature is sufficiently low to the extent that the identity feature and the age feature may be considered uncorrelated. In an example of the disclosure, when the correlation coefficient between the identity feature and the age feature is less than a preset value, it may be considered that the two are uncorrelated. The preset value may be set as appropriate, which is not limited in this embodiment of the disclosure.

In summary, according to the model training method provided in this embodiment of the disclosure, in a training process, an identity feature and an age feature of a sample face image are decomposed by using a feature extraction module, a correlation coefficient corresponding to training batch data is determined according to the identity feature and the age feature, decorrelation constraint is increased by using the correlation coefficient, and based on decorrelated adversarial learning, the identity feature and the age feature recognized by the feature extraction module eventually obtained through training have a sufficiently low correlation, thereby improving the recognition accuracy, reducing age-induced interference, and improving the reliability of a recognition result of age-invariant face recognition.

Based on the model training method provided in the embodiments of the disclosure, an embodiment of the disclosure further provides a face recognition method, which is implemented based on the feature extraction module trained by using the model training method. The face recognition method is described below with reference to the accompanying drawings.

It would be understood that the age-invariant face recognition method provided in the disclosure is applicable to any processing device with a graphics processing capability. The processing device may specifically include a CPU and/or GPU terminal, and the terminal may independently implement the age-invariant face recognition method provided in the disclosure or cooperate with a server to implement the age-invariant face recognition method provided in the disclosure.

To make the method clearer and easier to understand, the age-invariant face recognition method is described below with specific scenarios.

Figure 5:
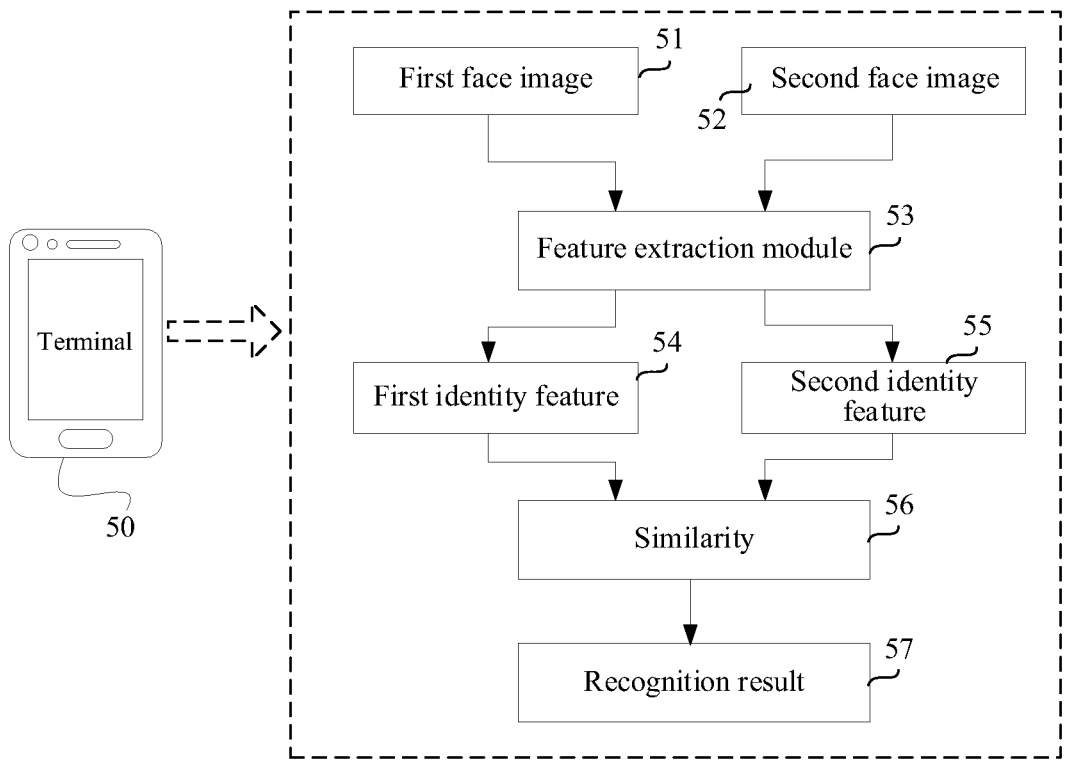
FIG. 5 is an architectural diagram of a scenario of an age-invariant face recognition method according to an example embodiment of the disclosure.

FIG. 5 is an architectural diagram of a scenario of an age-invariant face recognition method. This scenario includes a terminal 50. A user triggers an age-invariant face recognition operation by using the terminal 50, and the terminal 50 obtains a first face image 51 and a second face image 52 in response to the operation. An identity feature of a face part in the first face image 51 is obtained by using a pre-trained feature extraction module 53 for use as a first identity feature 54, an identity feature of a face part in the second face image 52 is obtained by using the feature extraction module 53 for use as the second identity feature 55, a similarity 56 between the faces in the first face image 51 and the second face image 52 is determined according to the first identity feature 54 and the second identity feature 55, and a recognition result 57 is then displayed. The recognition result 57 includes the similarity 56.

Next, from the perspective of a terminal, the operations of the age-invariant face recognition method provided in this embodiment of the disclosure are described in detail.

Figure 6:
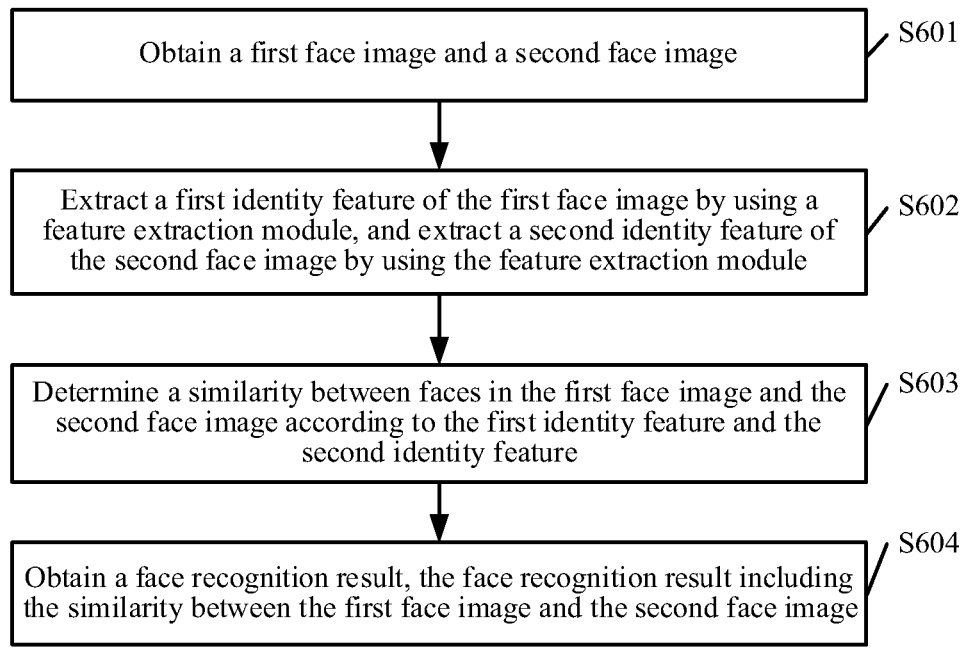
FIG. 6 is a flowchart of an age-invariant face recognition method according to an example embodiment of the disclosure.

FIG. 6 is a flowchart of an age-invariant face recognition method. The method includes the following operations:

S601: Obtain a first face image and a second face image.

The first face image and the second face image are two face images to be identified. The first face image and the second face image may be two face images of different ages, which are used for identifying whether the two face images are face images of the same person by using the age-invariant face recognition method of the disclosure.

S602: Extract a first identity feature of the first face image by using a feature extraction module, and extract a second identity feature of the second face image by using the feature extraction module.

The feature extraction module is a pre-trained module. A correlation coefficient of training batch data is obtained after the feature extraction module extracts an identity feature and an age feature of a sample face image in the training batch data. Decorrelation training of the identity feature and the age feature is performed on the feature extraction module based on the correlation coefficient. That is, the feature extraction module is trained by using the model training method shown in FIG. 2 or FIG. 3.

S603: Determine a similarity between faces in the first face image and the second face image according to the first identity feature and the second identity feature.

The first identity feature may represent identity information of the face part in the first face image, and the second identity feature may represent identity information of the face part in the second face image. Therefore, the similarity between the first identity feature and the second identity feature may represent the similarity between the faces in the first face image and the second face image. Based on this, a similarity between a first identity feature vector and a second identity feature vector may be calculated as the similarity between the faces in the first face image and the second face image.

The similarity between vectors may be represented by a vector distance. In an example of the disclosure, the similarity between vectors may be measured by a cosine of an angle between the vectors, that is, a cosine distance. When the cosine of the angle is larger, the angle between the two vectors is smaller, and the similarity is higher. When the cosine of the angle is smaller, the angle between the two vectors is larger, and the similarity is lower. A value range of the cosine of the angle is [−1, 1]. In some example embodiments, the cosine value of the angle may be normalized to represent the similarity in the form of percentage.

In an implementation of the disclosure, a corresponding distance, for example, a Euclidean distance, or a correlation distance, may be used to measure the similarity between vectors. This is not limited in the embodiments of the disclosure.

S604: Obtain a face recognition result, the face recognition result including the similarity between the first face image and the second face image.

In some embodiments, the recognition result includes the similarity between the faces in the first face image and the second face image, and the recognition result may further include a discrimination result of whether the first face image and the second face image are face images of the same person.

In some example embodiments, when the similarity between the faces in the first face image and the second face image is greater than a similarity threshold, it is determined that the first face image and the second face image are face images of the same person. When the recognition result is displayed, it may also be displayed that the first face image and the second face image are the face images of the same person.

The similarity threshold may be set as appropriate. In an example of the disclosure, the threshold may be set to 90%.

It can be seen from the above that according to the face recognition method provided in the embodiments of the disclosure, the identity features of the face parts in the first face image and the second face image are extracted by using the pre-trained feature extraction module to obtain the first identity feature and the second identity feature, the similarity between the face parts in the first face image and the second face image is determined based on the first identity feature and the second identity feature, and the similarity is used as the recognition result and the recognition result is displayed. As the identity feature extracted by the feature extraction module has a very low correlation with the age feature, the age information contained in the identity feature has less influence on face recognition, which leads to high recognition accuracy and high reliability of the recognition result.

An embodiment shown in FIG. 6 shows that a terminal independently implements the age-invariant face recognition method of the disclosure. In other possible implementations of the embodiments of the disclosure, the terminal may cooperate with a server to implement the age-invariant face recognition method.

Specifically, the terminal transmits the first face image and the second face image to the server, the server extracts the identity feature of the face part from the first face image by using the feature extraction module to obtain the first identity feature, extracts the identity feature of the face part from the second face image to obtain the second identity feature, and determines the similarity between the face parts in the first face image and the second face image based on the first identity feature and the second identity feature. The server then transmits the similarity as the recognition result to the terminal, and the terminal displays the recognition result to implement the age-invariant face recognition.

It would be understood that the age-invariant face recognition method provided in the disclosure is applicable to many fields such as criminal investigation, family tracing, and security through AI technologies. The following uses an application scenario of family tracing as an example to describe the model training method and the age-invariant face recognition provided in the disclosure.

Figure 7:
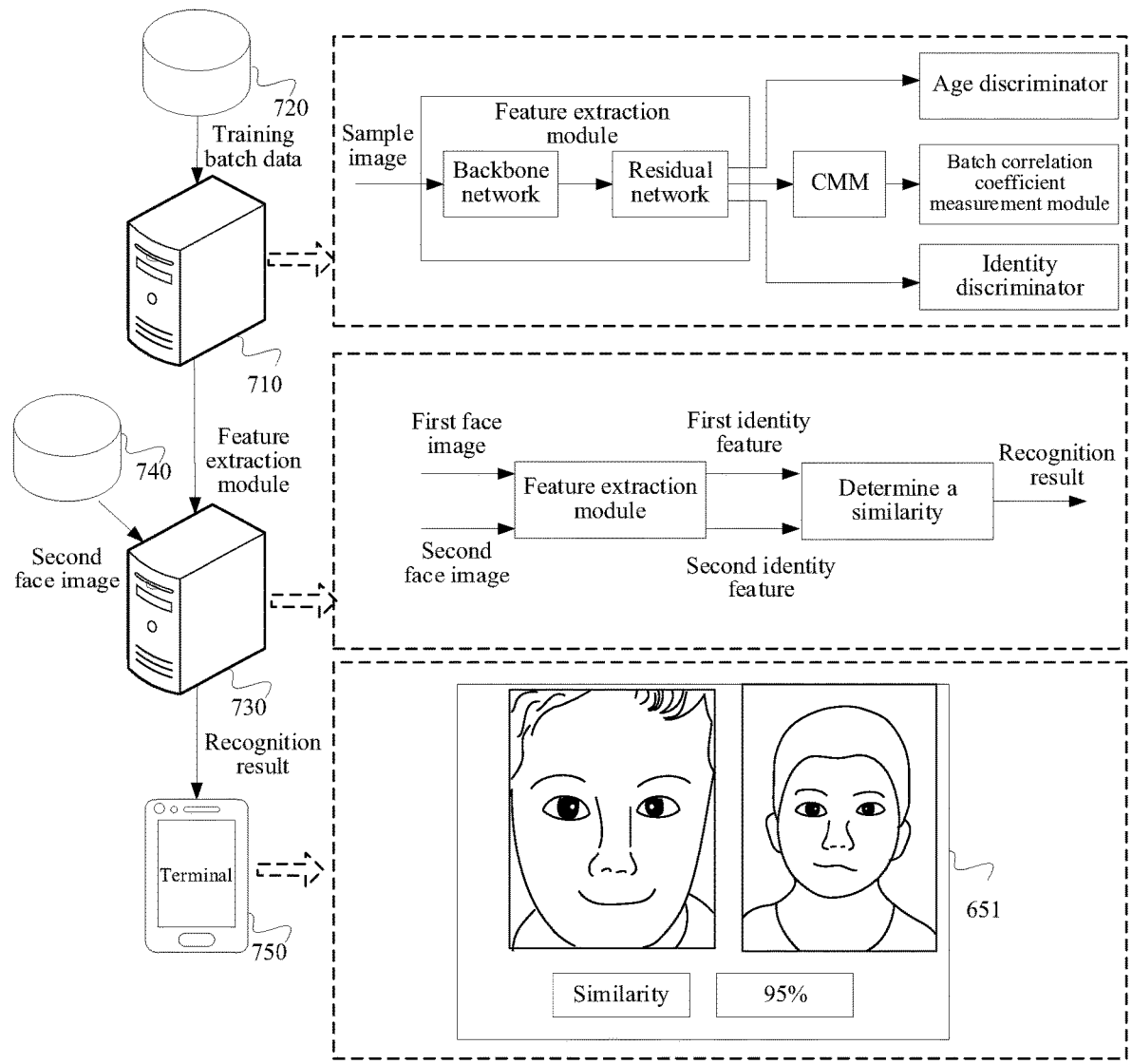
FIG. 7 is a schematic diagram of a scenario of a model training method and a face recognition method according to an example embodiment of the disclosure.

FIG. 7 is a schematic diagram of a scenario of a model training method and an age-invariant face recognition method. This scenario includes a training server 710, a sample database 720, a recognition server 730, a missing persons information database 740, and a terminal 750. The training server 710 trains the feature extraction module by using training samples in the sample database 720. The recognition server 730 performs age-invariant face recognition on a first face image uploaded by a searcher and a second face image in the missing persons information database by using the feature extraction module, to obtain a similarity between the image uploaded by the searcher and a face part in the second face image in the missing persons information database, and returns the second face image of which the similarity between the face parts in the second face image and the first face image is greater than a similarity threshold and the similarity to the terminal 750 for use as a recognition result. The terminal 750 displays the recognition result, as shown in an interface 751. In this manner, the searcher may determine, based on the recognition result, whether the second face image is a face image of a missing person (e.g., a missing relative of the searcher).

Specifically, the sample database 720 stores a plurality of sets of training samples, and each set of training samples includes at least two training samples, specifically, face images of the same person at different ages and corresponding identity labels and age labels. During the training of the model, the plurality of sets of training samples are batched to obtain training batch data, and the training batch data is used for training the model in batches.

The following uses the training process for one piece of training batch data as an example to describe the model training method. For each training sample in a training batch, the training server 710 first extracts the initial feature from the sample face image through the backbone network, and then linearly decomposes the initial feature into the identity feature and age feature through the residual network. The identity feature and the age feature are inputted into respective discriminators for joint supervised learning. In addition, the identity feature and the age feature are inputted into the CMM to obtain corresponding canonical correlation mapping variables. After canonical correlation mapping variables corresponding to each training sample in the training batch data are obtained, the batch correlation coefficient measurement module may be used to calculate the correlation coefficient corresponding to the training batch data based on the foregoing Formula 7, and perform the decorrelated training of the identity feature and age feature based on the correlation coefficient.

In the adversarial training, specifically, the parameters of the feature extraction module, that is, the backbone network and the residual network are first fixed, and the parameter of the CMM is updated to maximize the absolute value $|\rho|$ of the correlation coefficient, that is, to find the canonical mapping with the largest correlation. The parameter of the CMM is then fixed and the parameters of the feature extraction module are updated to minimize the absolute value $|\rho|$ of the correlation coefficient. In this manner, the correlation between the identity feature and the age feature may be minimized in the mapping direction with the largest canonical correlation coefficient.

The whole training process includes three training tasks based on the identity discriminator, the age discriminator and the DAL. The overall loss function is determined according to the loss functions of the three training tasks. The weight of the loss function of each training task may be adjusted as appropriate. When the overall loss function converges, training may be stopped, and a finally trained feature extraction module is obtained, which may be used for age-invariant face recognition.

Next, a process of the recognition server 730 performing the age-invariant face recognition by using the feature extraction module is described in detail. A searcher uploads the first face image of a missing person (e.g., missing relative) by using the terminal 750, and the first face image may be specifically a face image of the missing person in childhood. The recognition server 730 extracts the identity feature of the face part from the first face image to obtain the first identity feature by using the feature extraction module, extracts the identity feature of the face part from the second face image in the missing persons information database 740 to obtain the second identity feature, and then calculates a similarity between the first identity feature and each second identity feature to determine a similarity between the face parts in the first face image and each second face image in the missing persons information database. If the similarity between the second face image and the first face image is greater than a similarity threshold, the second face image and the similarity threshold are returned to the terminal 750 as the recognition result. The terminal 750 displays the recognition result, so that the searcher may find the missing person based on the recognition result.

The above describe example implementations of the model training method and face recognition method provided by the embodiments of the disclosure. Based on this, the embodiments of the disclosure further provide corresponding apparatuses. From the perspective of functional modularization, the apparatuses are described as follows.

Figure 8:
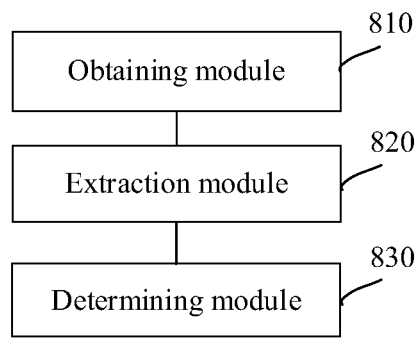
FIG. 8 is a schematic structural diagram of an age-invariant face recognition apparatus according to an example embodiment of the disclosure.

FIG. 8 is a structural block diagram of a face recognition apparatus according to an example embodiment of the disclosure. Descriptions are provided by using an example in which the apparatus is applied to a server, but the disclosure is not limited thereto. As shown in FIG. 8, the apparatus includes:

an obtaining module 810, configured to obtain a first face image and a second face image;

an extraction module 820, configured to: extract a first identity feature of the first face image by using a feature extraction module, and extract a second identity feature of the second face image by using the feature extraction module, the feature extraction module being a pre-trained module, a correlation coefficient of training batch data being obtained after the feature extraction module extracts an identity feature and an age feature of a sample face image in the training batch data, decorrelated training of the identity feature and the age feature being performed on the feature extraction module based on the correlation coefficient;

a determining module 830, configured to determine a similarity between faces in the first face image and the second face image according to the first identity feature and the second identity feature; and the obtaining module 810 being further configured to obtain a face recognition result, the face recognition result including the similarity between the first face image and the second face image.

Figure 9:
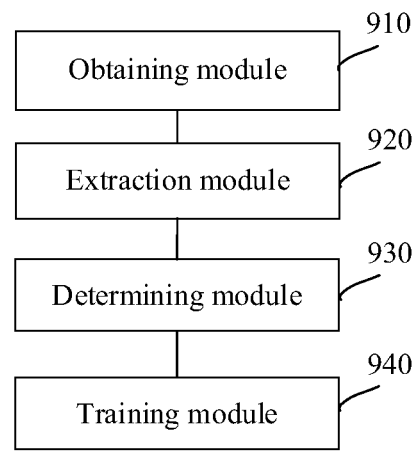
FIG. 9 is a schematic structural diagram of a model training apparatus according to an example embodiment of the disclosure.

FIG. 9 is a structural block diagram of a model training apparatus according to an example embodiment of the disclosure. Descriptions are provided by using an example in which the apparatus is applied to a server, but the disclosure is not limited thereto. As shown in FIG. 9, the apparatus includes:

an obtaining module 910, configured to obtain training batch data, the training batch data including a sample face image;

an extraction module 920, configured to extract an identity feature and an age feature of the sample face image by using a feature extraction module;

a determining module 930, configured to determine a correlation coefficient corresponding to the training batch data according to the identity feature and the age feature of the sample face image in the training batch data; and a training module 940, configured to perform decorrelated training of the identity feature and the age feature on the feature extraction module based on the correlation coefficient.

In an example embodiment, the determining module 930 is further configured to: obtain canonical correlation mapping variables corresponding to the identity feature and the age feature by using a CMM; and collect statistics of correlation coefficients for the canonical correlation mapping variables of the sample face image in the training batch data to obtain the correlation coefficient corresponding to the training batch data.

In an example embodiment, the training module 940 is further configured to update a parameter of the CMM with an objective of increasing an absolute value of the correlation coefficient.

In an example embodiment, the sample face image is annotated with an identity label and an age label.

The training module 940 is further configured to perform joint supervised training on the feature extraction module based on the identity label by using an identity discriminator and based on the age label by using an age discriminator.

In an example embodiment, the training module 940 is further configured to update a parameter of at least one of the feature extraction module, the identity discriminator, or the age discriminator with an objective of reducing a training loss, the training loss being determined by at least one of an adversarial loss, an identity discrimination loss, or an age discrimination loss, the adversarial loss being determined according to the correlation coefficient.

In an example embodiment, the determining module 930 is further configured to perform weighted summation on the adversarial loss, the identity discrimination loss, and the age discrimination loss to obtain the training loss.

In an example embodiment, the identity discrimination loss is calculated by using an LMCL function.

In an example embodiment, the age discrimination loss is calculated by using a cross entropy loss function.

In an example embodiment, the feature extraction module includes an initial feature extraction module and a residual factorization module that are cascaded.

The extraction module 920 is further configured to: extract an initial feature of a face image by using the initial feature extraction module; and perform linear factorization on the initial feature by using the residual factorization module to obtain the identity feature and the age feature.

In an example embodiment, the extraction module 920 is further configured to: obtain the age feature by using the residual factorization module; and determine a difference between the initial feature and the age feature to obtain the identity feature.

When the face recognition apparatus shown in FIG. 8 and the model training apparatus shown in FIG. 9 are applied to the same server, the obtaining module 810 and the obtaining module 910 may be implemented as the same module, the extraction module 820 and the extraction module 920 may be implemented as the same module, and the determining module 830 and the determining module 930 may be implemented as the same module.

An embodiment of the disclosure further provides a device, including a processor and a memory:

the memory being configured to store a computer program; and the processor being configured to perform, according to the computer program, the model training method or the age-invariant face recognition method according to the embodiments of the disclosure.

The device provided in this embodiment of the disclosure is described below from the perspective of hardware substantiation.

Figure 10:
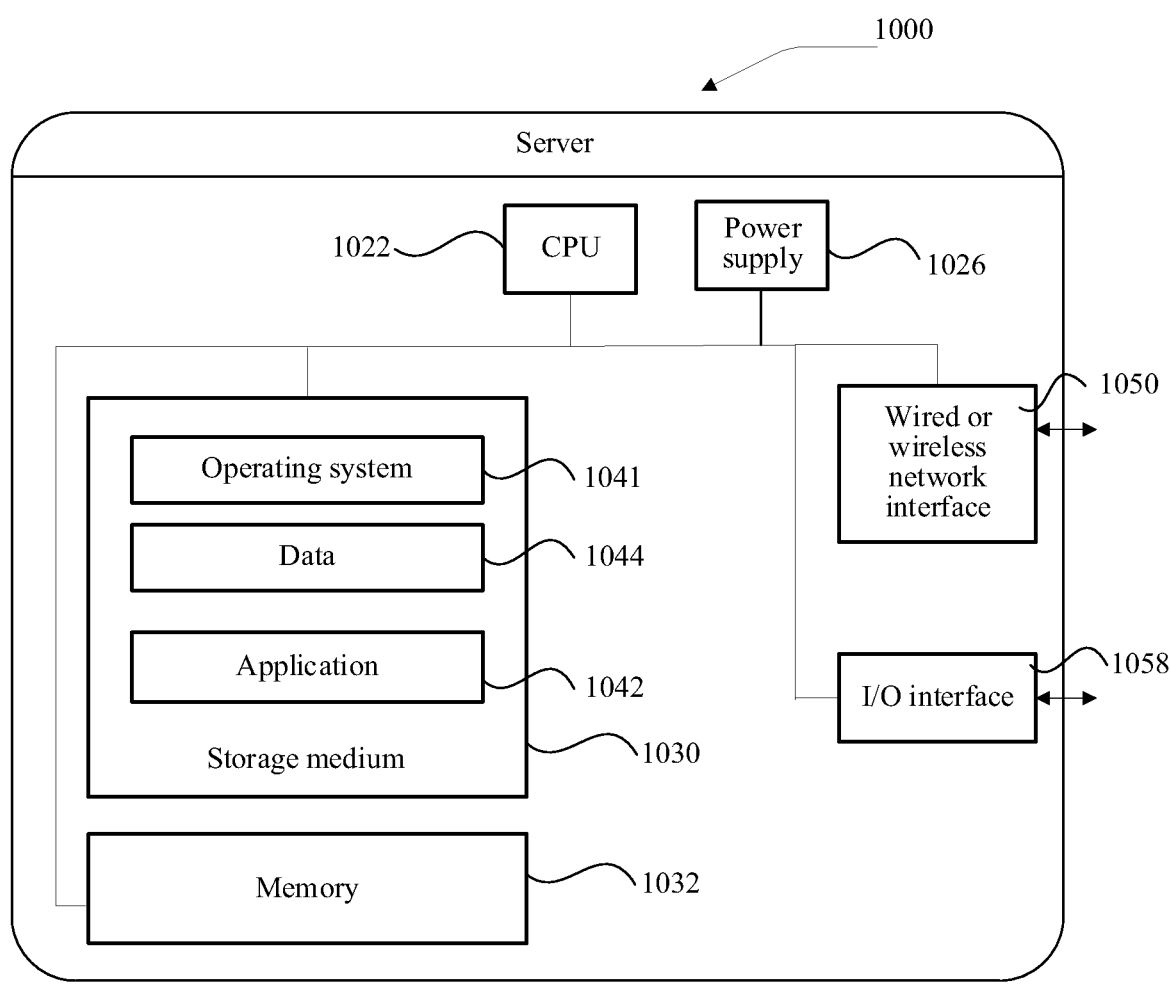
FIG. 10 is a schematic structural diagram of a server according to an example embodiment of the disclosure.

FIG. 10 is a schematic structural diagram of a server according to an embodiment of the disclosure. The server 1000 may vary greatly due to different configurations or performance, and may include one or more CPUs 1022 (for example, one or more processors) and a memory 1032, and one or more storage mediums 1030 (for example, one or more mass storage devices) that store application programs 1042 or data 1044. The memory 1032 and the storage medium 1030 may be transient or persistent storages. The program stored in the storage medium 1030 may include one or more modules (not shown), and each module may include a series of instruction operations for the server. Further, the CPU 1022 may be set to communicate with the storage medium 1030, and execute, on the server 1000, the series of instruction operations stored in the storage medium 1030.

The server 1000 may further include one or more power supplies 1026, one or more wired or wireless network interfaces 1050, one or more input/output interfaces 1058, and/or one or more operating systems 1041 such as Windows Server™, Mac OS X™, Unix™, Linux™, and FreeBSD™.

The operations performed by the server in the foregoing embodiments may be based on the server structure shown in FIG. 10.

The CPU 1022 is configured to perform the following operations:

obtaining training batch data, the training batch data including a plurality of training samples, each training sample including a sample face image and an identity label and an age label corresponding to the sample face image;

for each training sample in the training batch data, obtaining ab identity feature and an age feature corresponding to the sample face image in the training sample by using a feature extraction module, and obtaining canonical correlation mapping variables corresponding to the identity feature and the age feature by using a CMM;

collecting statistics of a correlation coefficient corresponding to the training batch data by using a batch correlation coefficient measurement module based on canonical correlation mapping variables corresponding to each training sample in the training batch data; and performing joint supervised learning by using an identity discriminator and an age discriminator, and performing decorrelated training of the identity feature and the age feature based on the correlation coefficient to obtain through training a feature extraction module that meets a training objective.

In an example embodiment, the CPU 1022 is further configured to perform operations of any implementation of the model training method provided by the embodiments of the disclosure.

An embodiment of the disclosure further provides another device (e.g., terminal). As shown in FIG. 10, for ease of description, only parts related to the embodiments of the disclosure are shown. For specific technical details that are not disclosed, refer to the method part in the embodiments of the disclosure. The terminal may be any terminal device including a mobile phone, a tablet computer, a personal digital assistant (PDA), a point of sales (POS), an on-board computer and the like. Hereinafter, the terminal being a mobile phone is used as an example.

Figure 11:
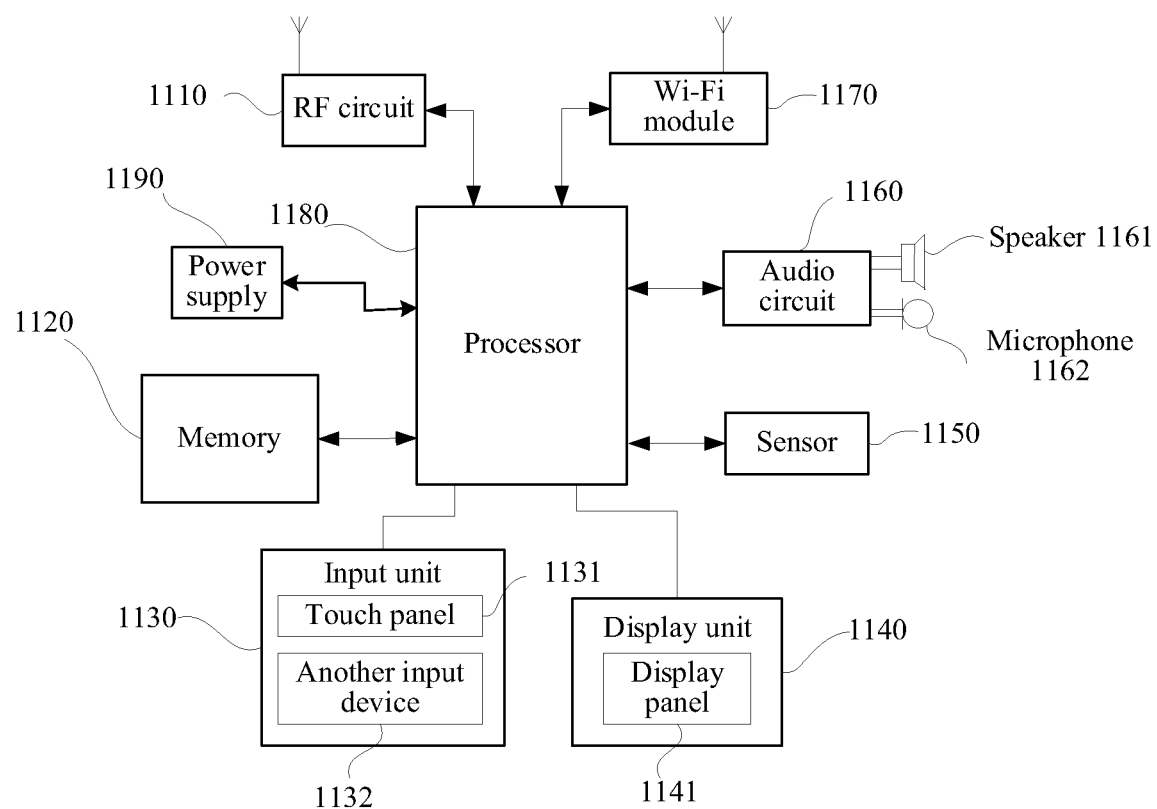
FIG. 11 is a schematic structural diagram of a terminal according to an example embodiment of the disclosure.

FIG. 11 is a structural block diagram of a part of a mobile phone related to a terminal according to an embodiment of the disclosure. Referring to FIG. 11, the mobile phone includes components such as a radio frequency (RF) circuit 1110, a memory 1120, an input unit 1130, a display unit 1140, a sensor 1150, an audio circuit 1160, a wireless fidelity (Wi-Fi) module 1170, a processor 1180, and a power supply 1190. A person skilled in the art would understand that the structure of the mobile phone shown in FIG. 11 does not constitute a limitation to the mobile phone, and the mobile phone may include more components or fewer components than those shown in the figure, or some components may be combined, or a different component deployment may be used.

The following makes a specific description of the components of the mobile phone with reference to FIG. 11.

The RF circuit 1110 may be configured to receive and send signals during an information receiving and sending process or a call process. Particularly, the RF circuit receives downlink information from a base station, then delivers the downlink information to the processor 1180 for processing, and transmits related uplink data to the base station. Generally, the RF circuit 1110 includes, but is not limited to, an antenna, at least one amplifier, a transceiver, a coupler, a low noise amplifier (Low Noise Amplifier, LNA), a duplexer, and the like. In addition, the RF circuit 1110 may also communicate with a network and another device through wireless communication. The wireless communication may use any communication standard or protocol, including, but not limited to, Global system for mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1120 may be configured to store a software program and module. The processor 1180 runs the software program and module stored in the memory 1120, to implement various functional applications and data processing of the mobile phone. The memory 1120 may mainly include a program storage area and a data storage area. The program storage area may store an operating system, an application program to perform at least one function (such as a sound playback function and an image display function), and the like. The data storage area may store data (such as audio data and an address book) created according to use of the mobile phone, and the like. In addition, the memory 1120 may include a high-speed random access memory, and may also include a non-volatile memory such as at least one disk storage device, a flash memory, or another volatile solid-state storage device.

The input unit (or input interface) 1130 may be configured to receive input digit or character information, and generate keyboard signal input related to a user setting and function control of the mobile phone. Specifically, the input unit 1130 may include a touch panel 1131 and another input device 1132. The touch panel 1131, also referred to as a touchscreen, may collect a touch operation of a user on or near the touch panel 1131 (such as an operation of a user on or near the touch panel 1131 by using any suitable object or attachment, such as a finger or a touch pen), and drive a corresponding connection apparatus according to a preset program. In an example embodiment, the touch panel 1131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1180. Moreover, the touch controller may receive and execute a command transmitted from the processor 1180. In addition, the touch panel 1131 may be implemented by using various types, such as a resistive type, a capacitive type, an infrared type, and a surface acoustic wave type. In addition to the touch panel 1131, the input unit 1130 may further include the another input device 1132. Specifically, the another input device 1132 may include, but is not limited to, one or more of a physical keyboard, a functional key (for example, a volume control key or a switch key), a track ball, a mouse, and a joystick.

The display unit 1140 may be configured to display information input by the user or information provided for the user, and various menus of the mobile phone. The display unit 1140 may include a display panel 1141. In an example embodiment, the display panel 1141 may be configured by using a liquid crystal display (LCD), an organic light-emitting diode (OLED), or the like. Further, the touch panel 1131 may cover the display panel 1141. After detecting a touch operation on or near the touch panel 1131, the touch panel transfers the touch operation to the processor 1180, so as to determine a type of the touch event. Then, the processor 1180 provides corresponding visual output on the display panel 1141 according to the type of the touch event. Although, in FIG. 11, the touch panel 1131 and the display panel 1141 are used as two separate parts to implement input and output functions of the mobile phone, in some embodiments, the touch panel 1131 and the display panel 1141 may be integrated to implement the input and output functions of the mobile phone.

The mobile phone may further include at least one sensor 1150 such as an optical sensor, a motion sensor, and other sensors. Specifically, the optical sensor may include an ambient light sensor and a proximity sensor. The ambient light sensor may adjust luminance of the display panel 1141 according to brightness of ambient light. The proximity sensor may switch off the display panel 1141 and/or backlight when the mobile phone is moved to the ear.

An audio circuit 1160, a speaker (e.g., loudspeaker) 1161, and a microphone 1162 may provide an audio interface between the user and the mobile phone. The audio circuit 1160 may convert received audio data into an electric signal and transmit the electric signal to the speaker 1161. The speaker 1161 converts the electric signal into a sound signal for output. On the other hand, the microphone 1162 converts a collected sound signal into an electric signal. The audio circuit 1160 receives the electric signal and converts the electric signal into audio data, and outputs the audio data to the processor 1180 for processing. The processor then transmits the audio data to, for example, another mobile phone by using the RF circuit 1110, or outputs the audio data to the memory 1120 for further processing.

Wi-Fi™ is a short distance wireless transmission technology. The mobile phone may assist, by using a Wi-Fi module 1170, the user to receive and transmit e-mails, browse a webpage, access streaming media, and so on, which provides wireless broadband Internet access for the user. Although FIG. 11 shows the Wi-Fi module 1170, it would be understood that the Wi-Fi module is not a necessary component of the mobile phone, and depending on an embodiment, the Wi-Fi module may be omitted as long as the scope of the essence of the disclosure is not changed.

The processor 1180 is the control center of the mobile phone, and is connected to various parts of the mobile phone by using various interfaces and lines. By running or executing the software program and/or module stored in the memory 1120, and calling data stored in the memory 1120, the processor performs various functions and data processing of the mobile phone, thereby performing overall monitoring on the mobile phone.

The mobile phone further includes the power supply 1190 (such as a battery) for supplying power to the components.

Preferably, the power supply may be logically connected to the processor 1180 by using a power management system, thereby implementing functions such as charging, discharging and power consumption management by using the power management system.

Although not shown in the figure, the mobile phone may further include a camera, a Bluetooth module, and the like. Details are not described herein again.

In an example embodiment, the processor 1180 is further configured to perform operations of any implementation of the face recognition method provided by the embodiments of the disclosure.

An embodiment of the disclosure further provides a computer-readable storage medium, configured to store a program code. The program code is used for performing any implementation of the model training method in the foregoing embodiments, or any implementation of the age-invariant face recognition method in the foregoing embodiments.

An embodiment of the disclosure further provides a computer program product including instructions. The instructions, when running on a computer, cause the computer to perform any implementation of the model training method in the foregoing embodiments, or any implementation of the age-invariant face recognition method in the foregoing embodiments.

A person skilled in the art would clearly understand that for convenience and conciseness of description, for specific working processes of the foregoing systems, devices and units, reference may be made to the corresponding processes in the foregoing method embodiments, and details are not described herein again.

In the embodiments provided in the disclosure, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of the disclosure. The foregoing storage medium includes any medium that may store program code, such as a USB flash drive, a removable hard disk, a ROM, a RAM, a magnetic disk, or an optical disc.

The technical solutions provided in the embodiments of the disclosure achieve at least the following beneficial effects.

In a training process, an identity feature and an age feature of a sample face image are decomposed by using a feature extraction module, a correlation coefficient corresponding to training batch data is determined according to the identity feature and the age feature, decorrelation constraint is increased by using the correlation coefficient, and based on decorrelated adversarial learning, the identity feature and the age feature recognized by the feature extraction module eventually obtained through training have a sufficiently low correlation, thereby improving the recognition accuracy, reducing age-induced interference, and improving the reliability of a recognition result of age-invariant face recognition.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions of the disclosure, but not for limiting the disclosure. Although the disclosure is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of the disclosure.

What is claimed is:

1. A face recognition method, performed by at least one processor of a computing device, the method comprising:
   obtaining a first face image and a second face image;
   extracting a first identity feature of the first face image by using a feature extraction module, and extracting a second identity feature of the second face image by using the feature extraction module, wherein the feature extraction module is implemented by using a neural network, and pre-trained in a manner such that a correlation coefficient of training batch data is obtained based on an identity feature and an age feature of a sample face image in the training batch data, and decorrelated training of the identity feature and the age feature is performed on the feature extraction module based on the correlation coefficient; and
   performing a face recognition based on determining a similarity between faces in the first face image and the second face image according to the first identity feature and the second identity feature.

2. A computer device, comprising a processor and a memory:
   the memory being configured to store a computer program; and
   the processor being configured to perform, according to the computer program, the method according to claim 1.

3. A non-transitory computer-readable storage medium, configured to store a program code, the program code being used for performing the method according to claim 1.

4. A model training method, performed by at least one processor of a computing device, the method comprising:
   obtaining training batch data, the training batch data comprising a sample face image;
   extracting an identity feature and an age feature of the sample face image by using a feature extraction module, which is implemented by using a neural network;
   determining a correlation coefficient corresponding to the training batch data according to the identity feature and the age feature of the sample face image in the training batch data; and
   performing decorrelated training of the identity feature and the age feature on the feature extraction module based on the correlation coefficient.

5. The method according to claim 4, wherein the determining the correlation coefficient comprises:
   obtaining canonical correlation mapping variables corresponding to the identity feature and the age feature by using a canonical mapping module (CMM); and
   collecting statistics of correlation coefficients for the canonical correlation mapping variables of the sample face image in the training batch data to obtain the correlation coefficient corresponding to the training batch data.

6. The method according to claim 5, wherein the performing the decorrelated training comprises:
   updating a parameter of the CMM, to increase an absolute value of the correlation coefficient.

7. The method according to claim 4, wherein the sample face image is annotated with an identity label and an age label; and
   the method further comprises:
   performing joint supervised training on the feature extraction module based on the identity label by using an identity discriminator and based on the age label by using an age discriminator.

8. The method according to claim 7, wherein the performing the joint supervised training comprises:
   updating a parameter of at least one of the feature extraction module, the identity discriminator, or the age discriminator, to reduce a training loss,
   the training loss being determined by at least one of an adversarial loss, an identity discrimination loss, or an age discrimination loss, the adversarial loss being determined according to the correlation coefficient.

9. The method according to claim 8, further comprising:
   performing weighted summation on the adversarial loss, the identity discrimination loss, and the age discrimination loss to obtain the training loss.

10. The method according to claim 8, wherein the identity discrimination loss is calculated by using a large margin cosine loss (LMCL) function.

11. The method according to claim 8, wherein the age discrimination loss is calculated by using a cross entropy loss function.

12. The method according to claim 4, wherein the feature extraction module comprises an initial feature extraction module and a residual factorization module that are cascaded; and
   the extracting the identity feature and the age feature comprises:
   extracting an initial feature of the sample face image by using the initial feature extraction module; and
   performing linear factorization on the initial feature by using the residual factorization module to obtain the identity feature and the age feature.

13. The method according to claim 12, wherein the performing the linear factorization comprises:
   obtaining the age feature by using the linear factorization performed by the residual factorization module; and
   determining a difference between the initial feature and the age feature to obtain the identity feature.

14. A non-transitory computer-readable storage medium, configured to store a program code, the program code being used for performing the method according to claim 13.

15. A model training apparatus, comprising:
   at least one memory configured to store program code; and
   at least one processor configured to read the program code and operate as instructed by the program code, the program code comprising:
   obtaining code configured to cause at least one of the at least one processor to obtain training batch data, the training batch data comprising a sample face image;
   extraction code configured to cause at least one of the at least one processor to extract an identity feature and an age feature of the sample face image by using a feature extraction module, which is implemented by using a neural network;
   determining code configured to cause at least one of the at least one processor to determine a correlation coefficient corresponding to the training batch data according to the identity feature and the age feature of the sample face image in the training batch data; and
   training code configured to cause at least one of the at least one processor to perform decorrelated training of the identity feature and the age feature on the feature extraction module based on the correlation coefficient.

16. The apparatus according to claim 15, wherein the determining code is further configured to cause at least one of the at least one processor to: obtain canonical correlation mapping variables corresponding to the identity feature and the age feature by using a canonical mapping module (CMM); and collect statistics of correlation coefficients for the canonical correlation mapping variables of the sample face image in the training batch data to obtain the correlation coefficient corresponding to the training batch data.

17. The apparatus according to claim 16, wherein the training code is further configured to cause at least one of the at least one processor to update a parameter of the CMM, to increase an absolute value of the correlation coefficient.

18. The apparatus according to claim 15, wherein the sample face image is annotated with an identity label and an age label; and the training cause at least one of the at least one processor to is further configured to perform joint supervised training on the feature extraction module based on the identity label by using an identity discriminator and based on the age label by using an age discriminator.

19. The apparatus according to claim 18, wherein the training code is further configured to cause at least one of the at least one processor to update a parameter of at least one of the feature extraction module, the identity discriminator, or the age discriminator, to reduce a training loss, the training loss being determined by at least one of an adversarial loss, an identity discrimination loss, or an age discrimination loss, the adversarial loss being determined according to the correlation coefficient.

20. The apparatus according to claim 19, wherein the training code is further configured to cause at least one of the at least one processor to perform weighted summation on the adversarial loss, the identity discrimination loss, and the age discrimination loss to obtain the training loss.

\* \* \* \* \*